R. A. MOORE.
ANTISKIDDING DEVICE FOR AUTOMOBILES.
APPLICATION FILED SEPT. 27, 1910.
998,714.  Patented July 25, 1911.
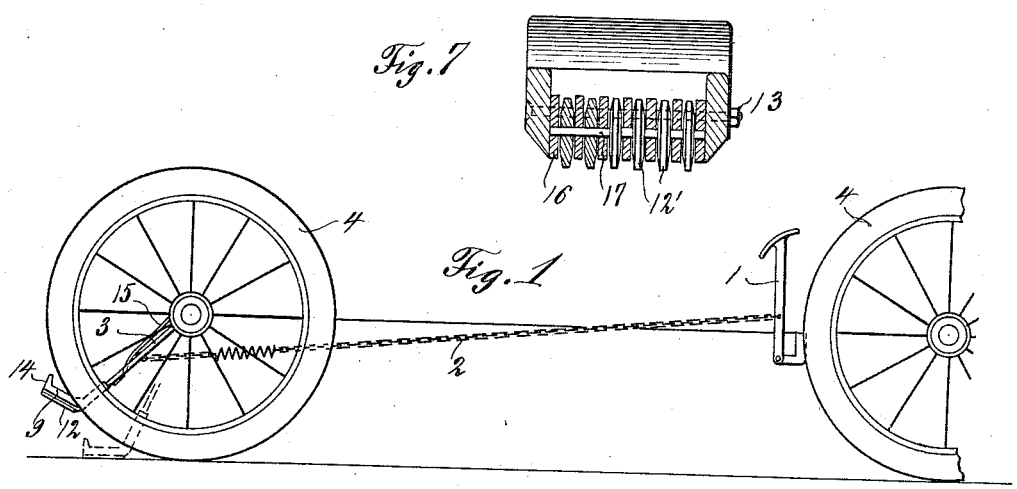
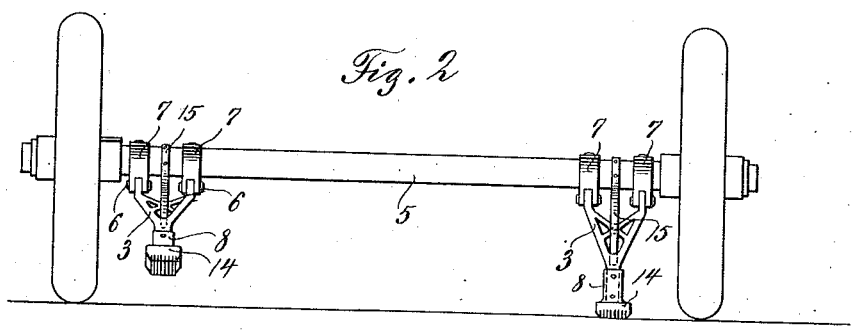
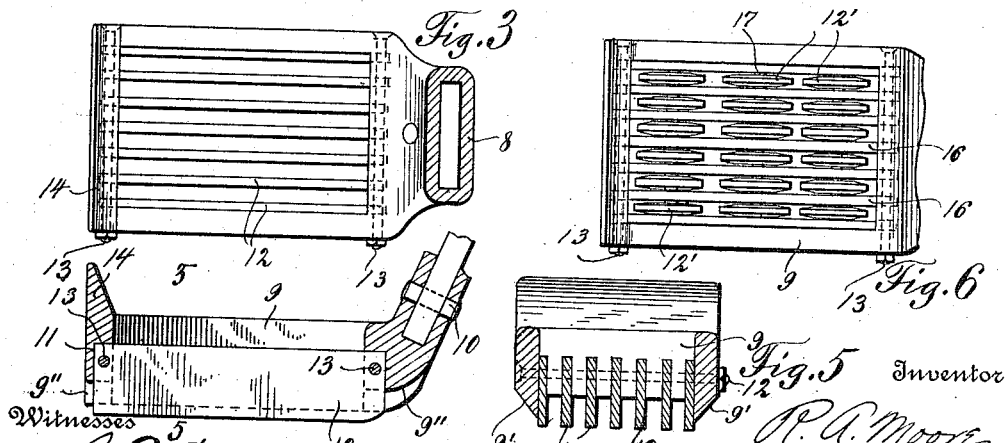

UNITED STATES PATENT OFFICE.

ROBERT ALEXANDER MOORE, OF CHICAGO, ILLINOIS, ASSIGNOR TO MOORE AUTO SKID PREVENTER COMPANY, OF NEW YORK, N. Y., A CORPORATION OF NEW YORK.

ANTISKIDDING DEVICE FOR AUTOMOBILES.

998,714.  Specification of Letters Patent.   Patented July 25, 1911.

Application filed September 27, 1910. Serial No. 584,137.

*To all whom it may concern:*

Be it known that I, ROBERT ALEXANDER MOORE, a citizen of the United States, residing at Chicago, in the county of Cook and State of Illinois, have invented certain new and useful Improvements in Antiskidding Devices for Automobiles, of which the following is a specification.

At the present time the anti-skidding devices most commonly in use on automobiles are of the type embodying a chain structure to encircle the tires of the vehicle wheels to increase traction in the well known manner. Devices of this type are objectionable for use especially in cities because of the injury to the surface of streets.

The present invention embodies improvements in anti-skidding devices of the type set forth in my United States Letters Patent No. 967,808, issued August 16, 1910, and wherein a shoe is carried at the rear portion of the vehicle and movable into contact with the surface over which said vehicle passes to afford a traction device for preventing skidding. These improvements reside especially in the form of the shoe and referring particularly to the drawings, Figure 1 is a side elevation showing the lower portion of a vehicle diagrammatically, the invention being applied thereto in operative position; Fig. 2 is a rear elevation, one of the anti-skidding devices being shown depressed and the other elevated; Fig. 3 is a top plan view of the shoe socket, being shown in section; Fig. 4 is a longitudinal sectional view of the shoe partly broken away; Fig. 5 is a transverse section taken about on the line 5—5 of Fig. 4; Fig. 6 is a bottom plan view of a modification, and Fig. 7 is a transverse section of said modification.

I utilize, in carrying out the present invention, any suitable controlling means for operating the anti-skidding device, and referring to Fig. 1 of the drawings, said means consists preferably of a foot lever or levers 1 connected by a chain 2 or similar flexible connection with a swinging bracket 3 at the rear portion of the vehicle, the wheels of the latter being shown at 4. One or more of the anti-skidding devices of this invention may be used, two being illustrated in the drawings as carried by a sleeve 5 in which the rear or drive axle of the vehicle is mounted. Each anti-skidding device comprises a swinging bracket 3 aforesaid which is pivoted at its upper end, as shown at 6, to a pair of clamps 7 detachably applied to the part 5. Preferably, to increase the substantiality of the bracket 3, the same is made of V-form. The lower end of the bracket 3 is received in an upwardly extending socket 8 of the shoe 9, suitable securing means 10 being employed to connect the parts 3 and 8.

The shoe 9 is of peculiar construction to most effectively perform the desired function in preventing skidding of the vehicle. Said shoe 9 comprises preferably a somewhat rectangular frame, the lower portions of the sides of which are beveled inwardly, as shown at 9', so that, as the frame moves downwardly, if the sides strike an obstacle, the latter will be forced laterally out of the way, permitting subsequent desired contact of the tread parts of the shoe with the surface over which the vehicle is traveling. The frame 9 is made open, and at its opposite ends is formed with a plurality of recesses 11 adapted to receive the ends of detachable tread members or plates 12, the upper portions of which are partially received in the recesses 11 and secured by means of transverse pins 13 intersecting the recesses and passing through the openings in said members 12. The opposite ends of the frame of the shoe 9 are cut away as shown at 9'' in order that the action of the tread members 12 may be most effective, especially when the shoe is operating upon a comparatively soft or yielding surface such as an ordinary road. However, the sides of the frame of the shoe project lower than the ends, the tread members 12 only extending a comparatively short distance below said sides sufficiently for a complete operative contact with a harder surface such as ordinary paved streets. The members 12 are braced against lateral stress or strain by being seated at their ends in the recesses 11. At its rear end, the shoe 9 has an upwardly extending flange 14 constituting a stop. This part 14 is advantageous when a machine to which the invention is applied is climbing a hill and it is desired to prevent backward movement should the brakes not work properly. Obviously, by depressing the lever 1, the shoe will be applied to the surface of the ground and the rear wall of the shoe is adapted to sink into the ground to the depth of the stop 14 and form with the shoe a rigid stop, preventing backward movement of the vehicle. Normally the shoe 9 is held in an elevated position by means of a spring 15 carried by the part 5, the lower end of said spring being engaged with the springing bracket 3 at a middle point in the body thereof.

The modification shown of the invention in Figs. 6 and 7 contemplates the use of one or more disks or small wheels 12' instead of tread plates 12, preferably a plurality of such wheels arranged one in front of the other. However, the frame of the shoe 9 may be employed also to support the disks or wheels 12', the latter being journaled upon pins 17 mounted in supporting plates 16, the latter being seated in the recesses at the ends of the frame of the shoe in the same manner in which the tread members 12 are seated in said recesses. The pins 17 are prevented from displacement by being received between the sides of the frame of the shoe as shown clearly in Fig. 7. The plates 16 and wheels 12' are removable together.

The frame of the shoe 9 being open, it will be obvious that when the anti-skidding device operates upon a soft surface, dirt, sand or similar portions of said surface will pass upwardly through spaces between the parts 12 or 12', and such materials under these conditions can not be compacted in the frame of the shoe to prevent proper operation of the latter. In both forms of the invention herein described, the tread members are readily removed when worn and replaced or inverted.

The formation and arrangement of the cut-away portions 9" with respect to the tread members 12 possesses a peculiar advantage. In the use of the invention, when a vehicle is traveling over asphalt streets or the like, the sides of the open frame of the shoe 9 will limit the penetration of the tread members with respect to the surface of the street so as to eliminate likelihood of injury to the latter. Where the vehicle passes over soft roads, the side portions of the frame of the shoes will not materially limit the penetrative action of the shoe with respect to the surface of the ground, because of the exposure of the front and rear ends of the tread members by the provision of the portions 9" aforesaid.

Having thus described my invention, what I claim as new is:

1. An anti-skidding device for automobiles comprising, a support movable toward and from the surface of the ground, and a shoe consisting of a horizontal open frame of somewhat rectangular form, and a plurality of tread members mounted on said frame and arranged parallel with the direction of movement of the shoe in use, the opposite ends of the frame being cut away at their lower edges to expose the lower portions of the tread members.

2. An anti-skidding device for automobiles comprising, a support movable toward and from the surface of the ground, and a shoe consisting of a horizontal open frame of somewhat rectangular form, and a plurality of detachable tread members mounted on said frame and arranged parallel with the direction of movement of the shoe in use, the opposite ends of the shoe being cut away at their lower edges to expose the front and rear portions of the tread members and the sides of the frame of the shoe extending lower than the ends but terminating above the lower edges of the tread members.

3. An anti-skidding device for vehicles comprising a shoe consisting of a horizontal open frame provided at its front and rear ends with recesses, a plurality of spaced tread members having their end portions seated in the recesses aforesaid, the bodies of the tread members spanning the space between the front and rear ends of the frame.

4. An anti-skidding device for vehicles comprising a shoe consisting of an open frame provided at its front and rear ends with recesses, tread members consisting of plates having the opposite ends thereof seated in the recesses aforesaid, pins passing through the opposite ends of the shoe and engaging the ends of said plates to prevent displacement thereof, the lower edges of the tread members projecting slightly lower than portions of the frame of the shoe.

5. An anti-skidding device for vehicles comprising a shoe provided at its front and rear ends with recesses, a plurality of tread members consisting of longitudinal plates, the ends of which are seated in said recesses, the lower edges of the tread members projecting below the shoes, and means detachably connecting said tread members with the shoe, the front and rear ends of the shoe being cut away to points extending above the lower edges of the sides of the shoe.

6. An anti-skidding device for vehicles comprising a shoe, a plurality of spaced tread plates carried by said shoe, and means detachably connecting said plates with the shoe, and tread wheels mounted on said plates between the same.

7. In an anti-skidding device for vehicles, the combination of a shoe movable into contact with the surface of the ground, and comprising an open frame, a plurality of plates mounted in said frame, means detachably securing said plates to the frame, and tread wheels supported on the plates and detachable therewith.

8. An anti-skidding device for vehicles comprising a shoe consisting of a horizontal open frame, tread members comprising plates extending longitudinally of said frame and having their opposite ends seated against the front and rear end portions of the frame, pins passing transversely through said tread members and the end portions of the frame, connecting the tread members therewith, a plurality of disks mounted between the plates constituting tread members, and other pins passing through said plates and having the disks aforesaid journaled thereon, the opposite ends of the last mentioned pins abutting with the inner faces of the sides of the frame, and being thereby prevented from displacement.

In testimony whereof I affix my signature in presence of two witnesses.

ROBERT ALEXANDER MOORE.

Witnesses:
TREGBERT LEWIN,
CHAS. STERNHEIM.

Copies of this patent may be obtained for five cents each, by addressing the "Commissioner of Patents, Washington, D. C."